United States Patent
Vieweg et al.

(10) Patent No.: US 6,611,194 B1
(45) Date of Patent: Aug. 26, 2003

(54) METHOD FOR INSERTING A SERVICE KEY IN A TERMINAL AND DEVICES FOR IMPLEMENTING SAID METHOD

(75) Inventors: Stefan Vieweg, Willich (DE); Matthias Jungemann, Aachen (DE); Maik Schmidt, Meerbusch (DE); Michael Thoenissen, Essen (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/380,791

(22) PCT Filed: Mar. 4, 1998

(86) PCT No.: PCT/DE98/00677

§ 371 (c)(1),
(2), (4) Date: Oct. 21, 1999

(87) PCT Pub. No.: WO98/39875

PCT Pub. Date: Sep. 11, 1998

(30) Foreign Application Priority Data

Mar. 4, 1997 (DE) .......................................... 197 11 037

(51) Int. Cl.[7] .............................................. G06F 7/04
(52) U.S. Cl. .......................... 340/5.2; 340/5.1; 340/5.8; 340/539
(58) Field of Search ........................ 340/5.1, 5.2, 5.21, 340/5.3, 5.31, 5.33, 5.5, 5.61, 5.64, 5.8, 539

(56) References Cited

U.S. PATENT DOCUMENTS 4,982,430 A * 1/1991 Frezza et al. ............... 380/211
5,396,558 A * 3/1995 Ishiguro et al. ............... 705/67
5,825,876 A * 10/1998 Peterson ........................ 380/4
5,838,251 A * 11/1998 Brinkmeyer et al. ........ 340/5.22
6,061,791 A * 5/2000 Moreau ....................... 713/171
6,081,601 A * 6/2000 Raivisto ..................... 380/270
6,094,487 A * 7/2000 Butler et al. ................ 380/270
6,225,888 B1 * 5/2001 Juopperi ..................... 340/5.8

* cited by examiner

Primary Examiner—Daryl Pope
(74) Attorney, Agent, or Firm—Cohen, Pontani, Lieberman & Pavane

(57) ABSTRACT

A secure and efficient key management system for utilizing a service key for retrieving service data transmitted to a terminal from a service center via a communication channel. A service key is inserted into a terminal and is used to enable the decryption of the received encrypted service data from the service center. The service center requests and obtains a coding key from a trust center when the service center receives a service key transmission request from the from the terminal. The service key transmission request includes a terminal identity number. The service center forwards the request to the trust center which returns the coding key associated with a decoding key corresponding to the specific terminal. The service center encrypts the service key with the coding key and transmits the service key to the terminal. The service key is decrypted in the terminal using the decoding key input to the terminal by the terminal manufacturer. Once the service key has been decrypted, the service data can correspondingly be decrypted to use by the terminal user.

14 Claims, 2 Drawing Sheets

METHOD FOR INSERTING A SERVICE KEY IN A TERMINAL AND DEVICES FOR IMPLEMENTING SAID METHOD

PRIORITY CLAIM

This is a U.S. national stage of application of PCT/DE98/00677, filed on Mar. 4, 1998. Priority is claimed on that application and on the following application: Country: Germany, Application No.: 197 11 037.1, filed Mar. 4, 1997.

BACKGROUND OF THE INVENTION

1. Field of the Invention

The invention relates to a method for inserting a service key in a terminal and to devices for carrying out the method.

2. Description of Related Art

A traffic-telematics service center transmits service data to at least one terminal via a private (e.g. mobile radio) or public (e.g. DAB radio, RDS-TMC radio) communication channel. Service data can, for example, be data for traffic information, traffic forecasts, navigation services etc., which is sent one way from the center to the terminal or is transmitted, on request, as two-way dialog between the center and the terminal. Since detecting and processing such data entail costs, it is normally transmitted only to paying subscribers (registered service users). To this end, service data is transmitted from the center to the terminal in encrypted form. To do this, the terminal and the center need to be provided with keys which match one another. For certain applications, it can also be desirable to allow service keys for service data which is registered only for a period of time to expire in the terminal after some time, or it can be desirable for such service keys to be updated. For inserting the keys, therefore, a relatively high level of security is necessary to prevent misuse. Encryption and authentication methods are known from other areas, such as television (pay TV). For encryption and decryption, basically symmetrical methods (using identical encryption and decryption keys) and asymmetrical methods (using matching but different encryption and decryption keys) are known.

SUMMARY OF THE INVENTION

The object of the invention is to optimize key-related procedures as easily, efficiently and inexpensively as possible. The object is achieved by the subject-matter of the independent claims.

The invention enables keys to be inserted simply, efficiently and securely. The insertion of new service keys, which may be necessary, for example, when a subscription period has expired for a particular service, is also enabled simply, efficiently and very securely. In this context, the insertion of a new service key does not require the terminal to be taken to a terminal manufacturer's or service provider's workshop; instead, according to the invention, a new service key can be inserted via communication channels, such as a fixed telephone network or mobile radio channel, and preferably mobile-radio short message. Communication between a terminal manufacturer and a trust center and/or between a service center (service provider) and a trust center and/or between a terminal manufacturer's appliances and (when a decryption key is inserted during manufacture) a telematics terminal can also take place via a communication to channel, such as a mobile radio, channel (e.g. mobile-radio short messages).

For a method which can be carried out securely and at the same time efficiently, it is advantageous for key handling to be divided into a plurality of phases. In this case, the first phase corresponds to providing a terminal with a manufacturer-specific key (decoding key). The second phase comprises the insertion of a service key in encrypted form, particularly in asymmetrically encrypted form, from the service center into the terminal using a coding key in the service center and a decoding key in the terminal. The third phase includes, encrypting service data as part of a service and transmitting it between the service for carrying out the method center and the terminal. In one-way operation, the service center sends service data in encrypted form to the terminal, where it is decrypted with the service key, and in two-way operation, it is possible to encrypt requests from a terminal to the service center and/or to encrypt transmitted service data from the service center to the terminal. Encrypting service data with a symmetrical key is particularly advantageous, because it means that relatively large data quantities can be encrypted in real time as part of a service and decrypted in real time at the terminal without excessive complexity. On the other hand, asymmetrical encryption of the service key produces the higher level of security necessary for transmitting it.

In addition, it is particularly advantageous to use, network security mechanisms when inserting a service key from a service center into the terminal, specifically when the service center communicates with the trust center and/or the service center communicates with the terminal. In addition, network security mechanisms can also be used, in particular, if the terminal manufacturer inserts an encryption key into a telematics terminal via a mobile-radio network etc. during ,manufacturing, however, during manufacture, it is also possible to insert an encryption key in the terminal without a mobile-radio channel etc., by installing hardware or software. Network security mechanisms can be authentication checks provided as standard during communication via a mobile-radio network, particularly SMSC addresses, MSISDN PIN numbers, PIN2 numbers etc. in the GSM network or in other networks. The network security mechanisms are then used in addition to other mechanisms, particularly those according to the invention.

The terminal identity number can be any desired number identifying a particular terminal. It can be inserted permanently in the terminal as hardware and/or software, preferably during manufacturing. It is expediently protected against manipulation and/or unauthorized reading.

According to on embodiment of the invention, a terminal can also receive service keys from a plurality of service centers and use them for decrypting the service center respective service data.

The method according to the invention can be implemented in the service center, preferably in the form of a program. Features essential to the invention, such as management of decoding keys and service keys, are provided in the terminal; matching coding keys and decoding keys and possibly also the terminal identity number are handled in a trust center.

BRIEF DESCRIPTION OF THE DRAWINGS

Further essential features of the invention are described and in the following description of an exemplary embodiment with reference to the drawing, in which.

DETAILED DESCRIPTION OF THE PRESENTLY PREFERRED EMBODIMENTS

Figure 1:
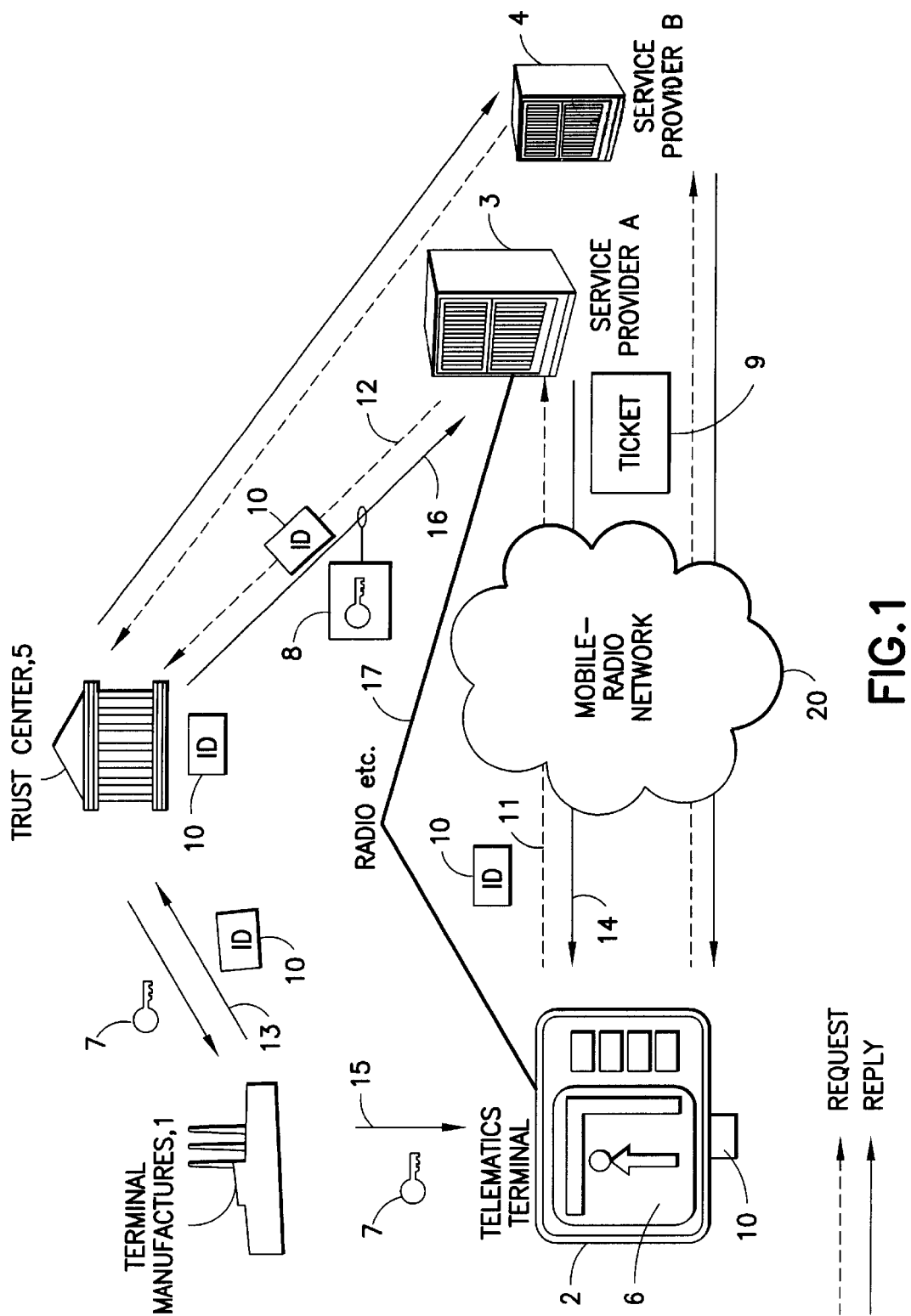
FIG. 1 is a general schematic illustration of the use of service keys, coding keys and decoding keys according to an embodiment of the present invention.

FIG. 1 shows a terminal manufacturer 1, a terminal 2 for traffic telematics services, two service centers, providers 3, 4 and a trust center 5.

A terminal 2 for traffic telematics services can be designed, for example, for showing traffic information and/or traffic forecasts and/or navigation information. In this case, the traffic telematics terminal 2 can be provided with internal or external input means such as keyboards, voice input etc. for interactive services such as navigation aids. In addition, the terminal 2 can be used to process service data and/or for position detection etc. The output can be visual and/or acoustic. In the example shown, the display 6 in the terminal 2 shows the position of the terminal with an arrow and a dot, and indicates a suggested road with the name and distance details, as well as a further road above this as a bar. However, the method according to the invention can also be used for any desired terminals of different design.

When the terminal 2 is manufactured at the terminal manufacturer 1, the terminal manufacturer 1 inserts a decoding key 7 into terminal 2, represented as a symbol, which (when an asymmetrical method is used, in particular) can be used for decoding a service key 9 encrypted in a service center with a coding key 8 (likewise represented as a symbol). In this case, a service key 9 (called "Ticket" in FIG. 1) encrypted with the coding key 8 is transmitted from a service center 3 or 4 to terminal 2, which allows the terminal to use the service key 9 to decode service data (relating to traffic information, navigation etc.) transmitted (17) by a service center 3, 4 at any desired instant (encrypted with such a service key 9) via a public communication channel such as radio (DAB, RDS-TMC etc.).

When the terminal 2 is manufactured at the terminal manufacturer 1, a terminal identification number is also provided permanently in the terminal 2 in addition to the decoding key 7. However, the terminal identification number can be provided in the terminal (by a supplier etc. at an earlier instant) even before said terminal manufacturer has finished manufacturing the terminal (inputting the decoding key). The terminal identity number need not comprise only digits but can, for example, also comprise letter. It can be any desired sequence implemented in a terminal and identifying the terminal.

The decoding key 7, provided in the terminal 2 by the terminal manufacturer 1 during manufacture (or similarly when the terminal is later coordinated with the key system according to the invention), is transmitted to the terminal manufacturer 1 by a trust center 5. In this case, transmission from the trust center to the terminal manufacturer can also be in coded form or use other security measures. In addition, in the example shown in FIG. 1, the terminal manufacturer 1 transmits (13) to the trust center 5 a terminal identity number 10 which enables the trust center 5 to assign the decoding key 7 to a terminal identity number and hence to a terminal. Thus, when a request is made by the service center 3 or 4 (in response to the terminal 2 sending a request, with the terminal identity number 10, to the service center 3 or 4 asking for a service key 9) indicating the (forwarded) terminal identity number 10, the trust center 5 can use the terminal identity number 10 to assign the appropriate coding key 8 (which is intended to be transmitted from the trust center to the service center 4) to the decoding key 7 which has already been allocated (and in this case relates to a particular terminal 2). The coding key 8 can also be assigned on the basis of data within the coding key and the decoding key, however; in this case, for example, particular bit sequences in the coding key or the decoding key can correspond or be known or assigned to one another in the service center.

The sequence for coded insertion of a service key 9 (for service data) from a service center 3 or 4 into a terminal 2 start with terminal 2 requesting (in step 11) a service key from a service center 3 or 4. The terminal 2 then transmits its terminal identity number etc. to the service center 3 or 4. This communication can take place via a communication network, particularly mobile-radio network, for example, as a mobile-radio short message (e.g. GSM-SMS), as can the ensuing reply. The service center 3, 4 checks whether it has a coding key 8 (for coding service keys which are to be transmitted) for the terminal 2 (identified by the transmitted terminal identity number 10 etc.). In the present case, the service center 3, 4 does not yet have a coding key 8 for the terminal 2. In step 12, it therefore requests, by transmitting the terminal identity number 10 (transmitted by the terminal) to the trust center 5, that the trust center transmit a coding key 8. In this case, the service center 3, 4 and the trust center 5 can communicate via a communication channel such as mobile radio, particularly mobile-radio short message (particularly GSM-SMS). The trust center 5 then uses the terminal identity number 10 which it receives from the service center 3, 4 to check whether it has a coding key 8 matching the terminal identity number for the terminal 2. If a coding key 8 can be assigned to the terminal identity number 10 etc., the trust center 5 transmits (step 16) to the service center 3 or 4 a coding key 8 appropriate for the terminal 2. The service center 4 uses the coding key 8 to code a service key, and transmits the service key 9 (in step 14) to the terminal 2. The terminal 2 uses its decoding key 7 (provided during manufacture etc.) to decode the service key 9 (transmitted in coded form). The telematics terminal 2 can then use this service key 9 to decode encrypted data which is transmitted by a service center 3 or 4 by mobile radio or by radio etc. and which relates to the service key 9. Dedicated service keys 9 can be provided for each of the different services from a service center.

In the example shown in FIG. 1, a terminal identity number 10 transmitted from the service center 3, 4 to the trust center 5 can be assigned to an associated coding key 8 in the following manner: when the terminal 2 is manufactured at the terminal manufacturer's 1, the terminal manufacturer requests, by indicating the terminal identity number 10, that the trust center 5 transmit a decoding key 7. The trust center 5 internally assigns the terminal identity number 10 (transmitted from manufacture 1 in step 13) for the terminal 2 to that decoding key 7 which it transmits to the terminal manufacturer 1 for the terminal 2 (to forward to the terminal 2 in step 15), using the individual transmitted terminal identity number 10. In this case, the trust center 5 assigns a coding key 8 to the terminal identity number 10 for a particular terminal 2 which matches the decoding key 7 (transmitted to the terminal) and which is later transmitted to a service center 3 or 4 when the service center requests a coding key from the trust center, by indicating the terminal identity number 10 (in step 12). This ensures that the service center 3 or 4 knows the coding key 8 which matches the decoding key 7 provided in terminal 2, and that the service center 3 or 4 can assign the coding key 8 on the basis of the terminal identity number 10, so that a service center 3 or 4 can use the coding key 8 to transmit a service key 9 to a specific terminal 2, which is known there, (which can be decrypted only by said terminal 2 using its decoding key 7) for a particular service.

Figure 2:
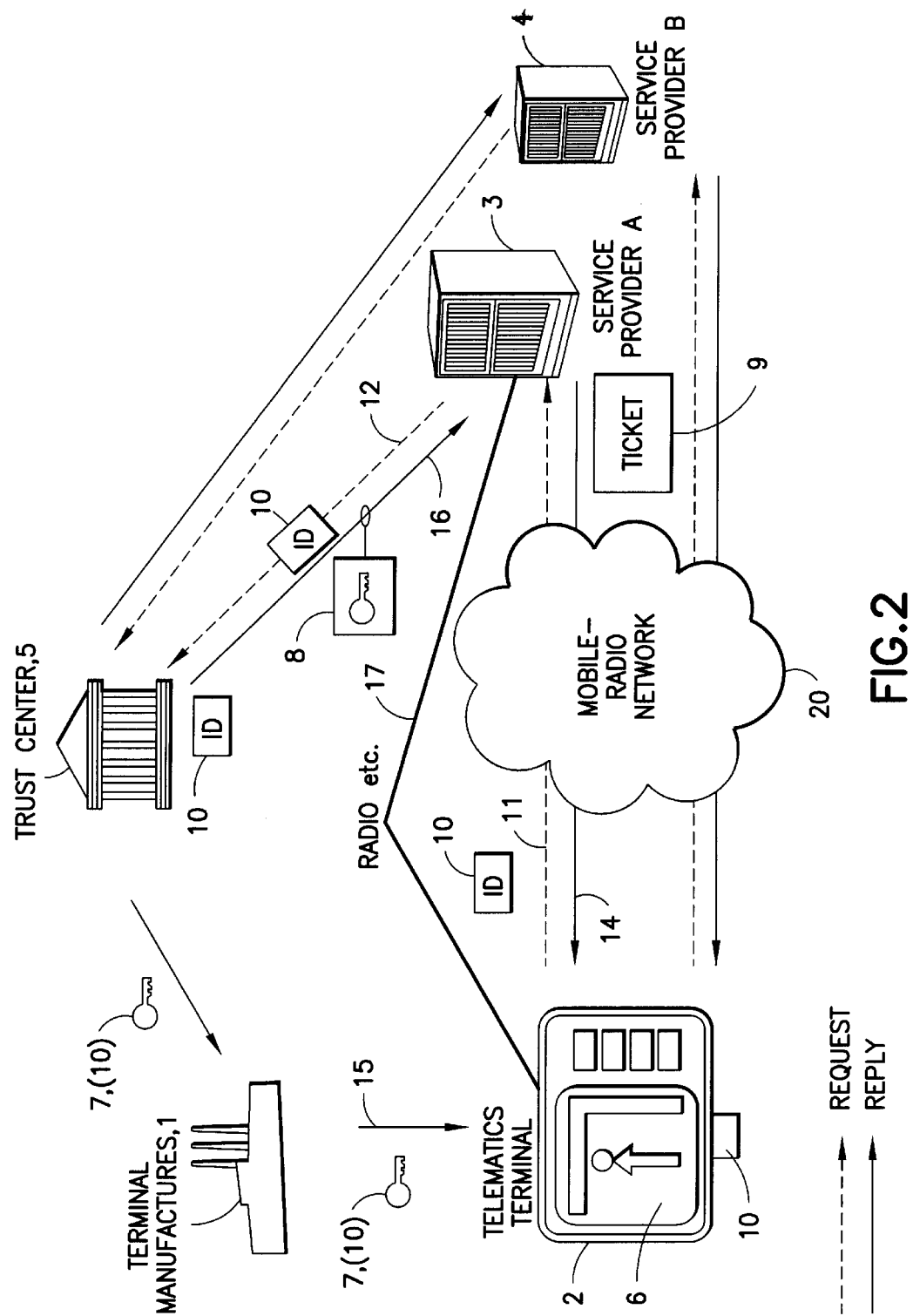
FIG. 2 is a modified schematic illustration of the use of service keys, coding keys and decoding keys according to another embodiment of the invention.

However, as shown in FIG. 2, there are also other possible assignment options for the coding key and the decoding key in the trust center 5, for example these can be the assignment of start sequences (or, similarly, end sequences) in a decoding key 7. The start sequences being identical or corresponding (in a way which is known to the trust center 5 and/or a service center 3, 4) in the coding key 8. Such start sequences in a coding key and a decoding key are equivalent to the terminal identity number 10 as shown in the example in FIG. 1. For example, a trust center 5 can transmit a start sequence etc. to a terminal manufacturer in a data set together with the actual decoding key 7, and start sequence is entered in the terminal there. When the terminal 2 requests (11), a service key from a service center 3, 4 the terminal 2 can transmit this start sequence etc. to the service center 3, which forwards (12) the start sequence to the trust center 1. In the trust center, here, assignment to a coding key (matching the terminal's decoding key) takes place, and the coding key (8) is transmitted 16 to the service center 3.

What is claimed is:

1. A method for utilizing a service key for retrieving service data transmitted to a terminal from a service center via a communication channel comprising the steps of:

requesting by a terminal manufacturer a decoding key from a trust center;

transmitting by the terminal manufacturer a terminal identity number to the trust center when requesting said decoding key;

assigning by the trust center said terminal identity number to the decoding key and to a coding key used to encrypt a service key;

transmitting said decoding key to said terminal manufacturer;

assigning and inputting by a terminal manufacturer the decoding key into the terminal corresponding to the coding key used to encrypt the service key;

receiving at the service center a service key transmission request containing the terminal identity number transmitted from the terminal;

requesting by the service center the coding key from the trust center;

transmitting the terminal identity number from the service center to the trust center when requesting the coding key;

obtaining the coding key corresponding to the terminal identity number from the trust center;

using the obtained coding key by the service center to encrypt the service key;

transmitting the encrypted service key to the terminal; and decrypting the service key at the terminal using the decoding key and enabling the terminal to decode service data transmitted to it via the communication channel.

2. The method set forth in claim 1, wherein said obtaining of the coding key from the trust center is performed only when the terminal identity number is known to the trust center.

3. The method set forth in claim 1, wherein the service center comprises a traffic telematics service center, wherein said service key enables decryption of traffic telematics service data transmitted to the terminal.

4. The method set forth in claim 1, wherein transmitting between the terminal and the service center is performed by radio communication.

5. The method set forth in claim 4, wherein said transmitting is performed by mobile radio.

6. The method set forth in claim 5, wherein said transmitting is performed by point-to-point mobile radio short messages.

7. The method set forth in claim 1, wherein communication between the service center and the trust center is performed using a fixed telephone network.

8. The method set forth in claim 1, wherein communication between the service center and the trust center is performed by radio communication.

9. The method set forth in claim 2, wherein communication between the service center and the trust center is performed by mobile-radio.

10. The method set forth in claim 8, wherein said communication is performed using point-to-point mobile radio short messages.

11. The method set forth in claim 1, further comprising utilizing mobile-radio specific security functions during communication between the terminal, the service center, and the trust center, said mobile-radio specific security functions comprising at least one selected from a group consisting of telephone numbers, MSISDN and PIN numbers.

12. The method set forth in claim 1, wherein the terminal is capable of obtaining service keys from a plurality of service centers and obtaining a corresponding decoding keys from the trust center.

13. The method set forth in claim 1, further comprising transmitting the service keys from the service center to the terminal in asymmetrically encrypted form.

14. The method set forth in claim 1, wherein service data is transmitted from the service center to the terminal in symmetrically encrypted form.

* * * * *